United States Patent
Abbema

[11] Patent Number: 5,346,261
[45] Date of Patent: Sep. 13, 1994

[54] COUPLED PIPE ASSEMBLY HAVING A TAPERED INTERIOR SLEEVE

[75] Inventor: William D. Abbema, Pearland, Tex.

[73] Assignee: Tuboscope Vetco International, Inc., Houston, Tex.

[21] Appl. No.: 36,844

[22] Filed: Mar. 25, 1993

[51] Int. Cl.5 .............................................. F16L 13/02
[52] U.S. Cl. ...................................... 285/22; 285/24; 285/55; 285/370
[58] Field of Search ..................... 285/21, 22, 55, 24, 285/370, 371

[56] References Cited

U.S. PATENT DOCUMENTS

| | | | |
|---|---|---|---|
| 2,366,579 | 1/1945 | Ahrens | 285/22 |
| 2,814,508 | 11/1957 | Seamark | 285/371 X |
| 3,508,766 | 4/1970 | Kessla et al. | 285/370 X |
| 4,913,465 | 4/1990 | Abbema et al. | |
| 5,219,187 | 6/1993 | Mikitka | 285/55 |

Primary Examiner—Dave W. Arola
Attorney, Agent, or Firm—Finnegan, Henderson, Farabow, Garrett & Dunner

[57] ABSTRACT

A coupled pipe assembly having a pair of opposed, axially-positioned pipes each having opposed beveled ends and interior corrosion-resistant linings. A sleeve having heat-deflecting material is provided axially within the pipes with the heat-deflecting material being positioned adjacent the opposed pipe ends to protect the corrosion-resistant linings from heat damage during welding of the pipe ends. The sleeve has a tapered cross-section extending to and forming a rounded end edge portion.

6 Claims, 2 Drawing Sheets

COUPLED PIPE ASSEMBLY HAVING A TAPERED INTERIOR SLEEVE

BACKGROUND OF THE INVENTION

1. Field of the Invention

This invention relates to a coupled pipe assembly wherein the opposed ends of pipes having an internal coating or lining of corrosion-resistant material are joined by welding. An internal sleeve is used in association with the coupled pipe ends to protect the corrosion-resistant lining of the pipes from heat damage incident to the welding operation. For this purpose, the internal sleeve has an internal corrosion-resistance lining. Each end of the sleeve has a tapered cross-section forming a rounded edge portion.

2. Description of the Prior Art

In various applications, such as in the oil and gas industry, there is a need for alloy pipe, such as steel pipe, provided with a lining of corrosion-resistant material. For this purpose, it is known to bond to the pipe interior various epoxy based materials, polyethylene, polyvinyl chloride and other thermoplastic and thermosetting materials. With pipe having these internal coatings, it is necessary to protect the homogenous integrity of the internal coating from damage from heat generated during the welding of the pipe ends. It is known for this purpose to use an internal sleeve with a heat-deflecting barrier positioned adjacent the weld zone of the opposed pipe ends. Coupled pipe assemblies of this type are disclosed in Abbema et al., U.S. Pat. No. 4,913,465 issued Apr. 3, 1990.

With conventional assemblies of this type, during welding of the pipe ends the integrity of the corrosion-resistant lining in the pipe is destroyed, particularly at portions near the weld.

With coupled pipe assemblies including the coupled pipe assembly of the aforementioned patent, it is necessary to inspect the assembled pipeline for discontinuities, such as cracks, corrosion, body wall loss and the like. This is typically achieved by ultrasonic techniques. For this purpose, a transducer is inserted through the pipeline to the coupling thereof. With assemblies having internal sleeves used to replace the interior corrosion-resistance coating of the pipes during welding, effective insertion and removal of the transducer is impaired by the sleeve. Specifically, the transducer will engage the sleeve ends to prevent the end of the transducer from passing beyond the sleeve. This may result in damage to the transducer, damage to the internal coating within the pipeline, the sleeve or both, and overall renders a "smart pigging" inspection operation impossible. In addition, the sleeve ends increase the coefficient of friction of the fluid flowing through the pipe and against the internal pipe wall. This substantially increases the erosion of the pipe. Pipe wear is also caused by the hydraulic shock resulting from the sudden change in velocity resulting when the fluid flowing through the pipe contacts the sleeve ends. Likewise, the sleeve ends provide areas within the pipe for adherence of contaminates, which results in an additional affect on the fluid velocity.

SUMMARY OF THE INVENTION

It is accordingly a primary object of the present invention to provide a coupled pipe assembly having an internal sleeve with internal tapered ends, wherein the sleeve is structured so that a transducer or other inspection device may be inserted therethrough and so that the coefficient of friction of fluid flowing through the pipe and the fluid velocity are not significantly affected.

Another object of the invention is to provide the internal sleeve of the coupled pipe assembly with an internal corrosion-resistant coating that maintains the integrity of the corrosion-resistant lining even if the lining is damaged during welding.

In accordance with the invention, a coupled pipe assembly is provided having a pair of opposed, axially positioned pipes each having opposed beveled ends spaced apart to form a separated area between. A corrosion-resistant lining is provided on interior surfaces of said pipes. A sleeve having an internal corrosion-resistant lining and a uniform, continuous diameter portion along a length thereof is inserted axially within the pipes between the opposed beveled ends along a uniform continuous diameter portion of the pipes. The sleeve includes at each end thereof an internally tapered cross-section extending to and forming a rounded end edge portion. A pair of O-ring seals are each circumferentially mounted on the sleeve a distance from each end thereof and in sealing engagement with the interior surfaces of the pipes. A circumferential relieved area is provided in an exterior surface of the sleeve between the O-ring seals. A layer of heat-deflecting material is provided within this relieved area and has an outer surface terminating short of the exterior surface of the sleeve. A plurality of retainers for retaining the heat-deflecting material within the relieved area of the sleeve are provided, with the retainers being connected to opposed edge surfaces of the relieved area in spaced-apart relation. Each of the retainers has a lug radially extending into the separated area between the opposed, beveled pipe ends and in contact therewith. A continuous weld deposit is produced in the separated area and is bonded to each lug and to the opposed beveled pipe ends to form a welded joint between the opposed ends of the pipes. A sealant is provided between the exterior surface of the sleeve and the interior surfaces of the pipes.

The coupled pipe assembly may have the internally tapered cross-section of the sleeve extending along an area of the sleeve within which the O-ring seals are circumferentially mounted. This tapered cross-section may terminate short of the relieved area of the sleeve within which the heat-deflecting material is provided. The relieved area and the layer of heat-deflecting material provided therein may be centrally disposed relative to the separated area between the opposed pipe ends. This separated area may have a narrowed portion within which each lug of the retainers is positioned and a diverging portion extending from this narrowed portion in which the weld deposit is produced. Each of the retainers may extend across the relieved area adjacent the center surfaces of the heat-deflecting material with each lug being centrally disposed on each associated retainer.

DETAILED DESCRIPTION OF THE PREFERRED EMBODIMENTS

Reference will now be made in detail to a presently preferred embodiment of the invention, an example of which is described below and illustrated in the accompanying drawings.

Figure 1:
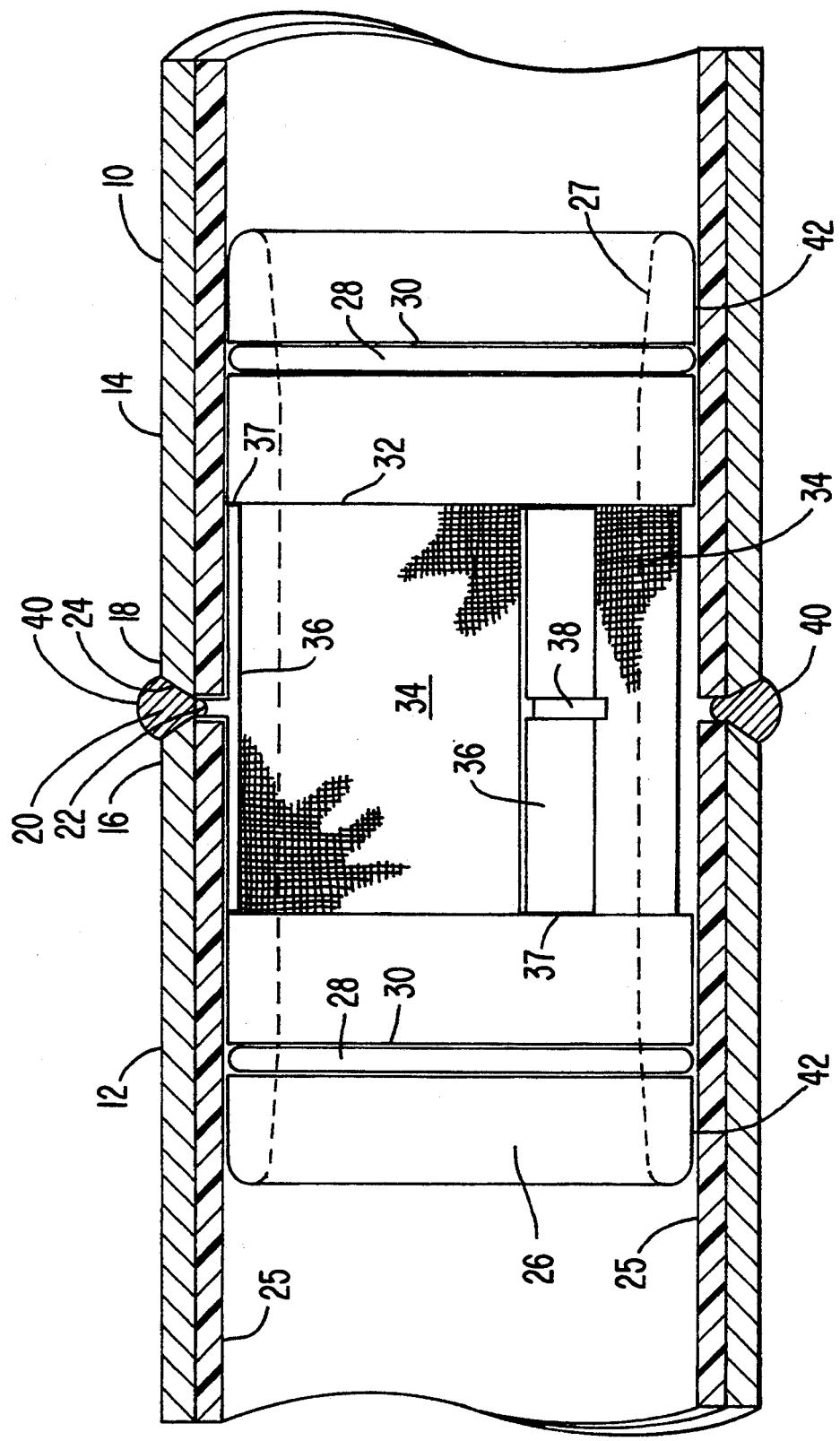
FIG. 1 of the drawings is a view in partial section of a coupled pipe of one embodiment of the invention.

With reference to the drawings, and for the present to FIG. 1 thereof, there is shown a coupled pipe assembly designated as 10, in accordance with an embodiment of the invention. The assembly 10 has two opposed pipes 12 and 14 in axial alignment. Each opposed pipe end 16 and 18 of pipes 12 and 14, respectively, is beveled to provide a separated portion 20 therebetween. The separated portion 20 has a narrowed portion 22 and a diverging portion 24 extending therefrom. The pipes may be made of steel and have a corrosion-resistant internal coating or layer 25 of any suitable conventional material.

Figure 2:
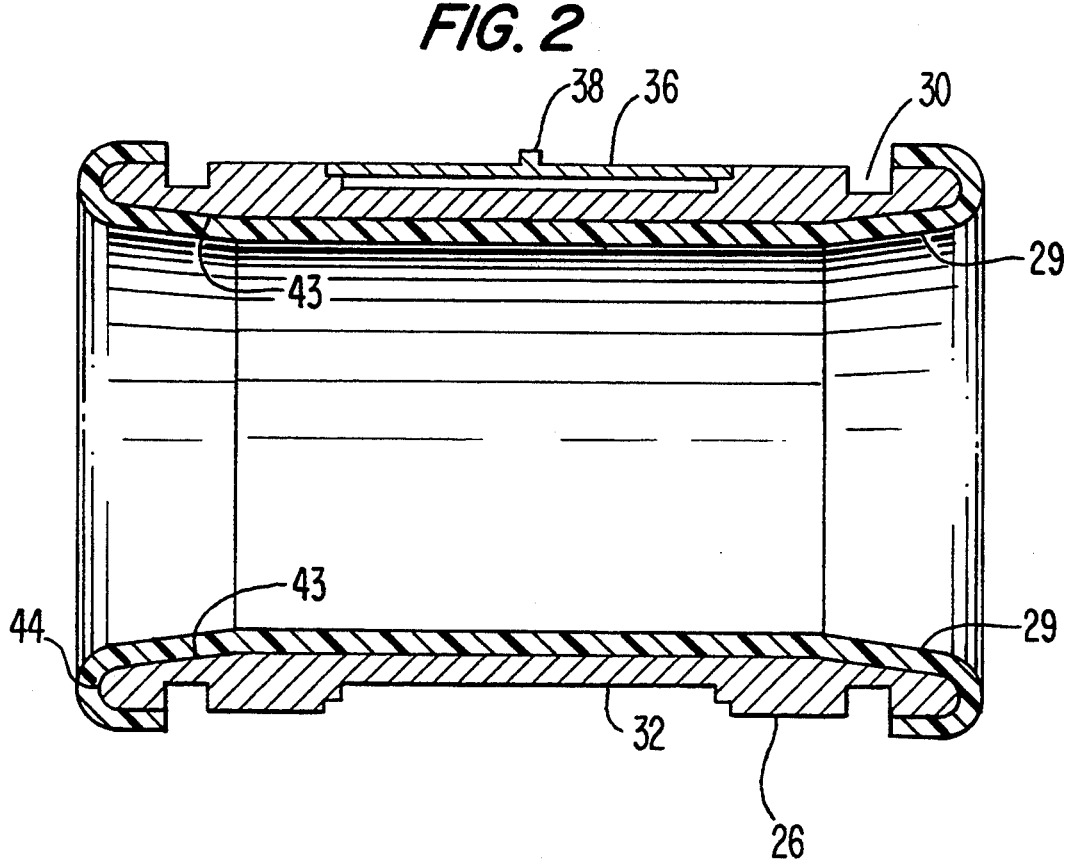
FIG. 2 is a detailed view of the sleeve shown in FIG. 1.

A sleeve 26 shown in FIG. 2 is provided near opposite ends thereof with a pair of O-ring seals 28 provided in grooves 30 of the sleeve, as shown in FIG. 1. The sleeve 26 has, as shown for purposes of clarity only in FIG. 2, an internal corrosion-resistant coating 29, which may be of the same material as coating 25. Centrally disposed in the exterior surface of the sleeve is a circumferential relieved area 32 around which is wrapped a heat-deflecting material 34, as shown in FIG. 1. The heat-deflecting material 34 may be a silica-based heat-deflecting wrap or asbestos wrap. Heat-deflecting material retainers 36 are welded, as at 37, to opposed edge surfaces of the relieved area and extend across the heat-deflecting material. Typically, three retainers 36 are provided each of identical construction and spaced at 120-degree intervals around the circumferential relieved area of the sleeve 26. Each retainer 36 has a lug 38 extending into the narrow portion 42 of the separated area between the pipe ends, as shown in FIG. 1. The pipe ends are coupled and the sleeve is secured to the assembly by a continuous weld deposit 40 provided in the separated area. The weld deposit is bonded to the lugs 38 to secure the sleeve in permanent position in the assembly.

An adhesive sealant 42 is provided between adjacent exterior surfaces of the sleeve and the interior surfaces of the tubing during insertion of the sleeve within the pipes to the position shown in FIG. 1. The sealant during this insertion of the sleeve within the pipes is spread evenly over the interior pipe surfaces and exterior sleeve surface by the O-ring seals 28 to form a fluid barrier at both ends of the sleeve.

The sleeve 26 at each end thereof has a tapered cross-section portion designated as 43, and best shown in FIG. 2. The tapered cross-section portion 43 of the sleeve 26 terminates in a rounded end edge portion 44. This structure when in assembly as shown in FIG. 1, permits a transducer head or a like inspection device to pass through the pipes for inspection. The rounded end edge portions 44 at each end of the sleeve 26 prevent hang-up of the transducer during insertion thereof. In addition, these rounded edge portions produce improved fluid flow resulting from decreased coefficient of friction of the fluid contacting the sleeve ends. This decreases erosion of the pipe caused by friction between the pipe wall interior and the fluid flowing through the pipe. It also decreases hydraulic shock by lessening the velocity changes produced by the fluid contact with the sleeve ends. The rounded sleeve ends also decrease the area for collection of contaminates.

The combination of the separated portion 20 and the associated lugs 38 positioned in the narrowed portion 22 thereof provides for effective and accurate separation of the pipe ends in proper position and alignment for welding. Upon welding, the weld deposit 40 then secures not only the pipe ends but also the sleeve in permanent assembly, as shown in FIG. 1. The retainers 36 maintain the heat-deflecting material 34 in position for effective protection of the corrosion-resistant internal coating of the assembly from damage during welding. The coating 43 of the sleeve 26 maintains the integrity of the corrosion-resistant internal coating of the assembly even if the coating 25 of the pipes is damaged during welding. In addition, the retainers 36 prevent the heat-deflecting material from being displaced into the separated area between the pipe ends during the insertion of the sleeve within the pipes to interfere with the welding operation.

What is claimed is:

1. A coupled pipe assembly comprising, a pair of opposed, axially positioned pipes each having opposed beveled ends spaced apart to form a separated area therebetween, a corrosion-resistant lining on interior surfaces of said pipes, a sleeve having an internal corrosion-resistant lining and a uniform, continuous diameter portion along a length thereof inserted axially within said pipes between said opposed beveled ends along a uniform continuous diameter portion of said pipes, said sleeve including each end thereof having an internally tapered cross-section extending to and forming a rounded end edge portion, a pair of O-ring seals each circumferentially mounted on said sleeve a distance from each end thereof and in sealing engagement with said interior surfaces of said pipes, a circumferential relieved area in an interior surface of said sleeve between said O-ring seals, a layer of heat-deflecting material provided within said relieved area and having an outer surface terminating short of said exterior surface of said sleeve, a plurality of retainers for retaining said heat-deflecting material within said relieved area of said sleeve, said retainers being connected to opposed edge surfaces of said relieved area in spaced-apart relation and each of said retainers having a lug radially extending into said separated area between said opposed, beveled pipe ends and in contact therewith, a continuous weld deposit produced in said separated area and bonded to each said lug and to the opposed beveled pipe ends to form a welded joint between said opposed ends of said pipes and a sealant provided between said exterior surface of said sleeve and said interior surfaces of said pipes.

2. The coupled pipe assembly of claim 1 further comprising, said internally tapered cross-section extending along an area of said sleeve within which said pair of O-ring seals are circumferentially mounted.

3. The coupled pipe assembly of claim 1 further comprising, said internally tapered cross-section terminating short of said relieved area.

4. The coupled pipe assembly of claims 1 or 2 further comprising, said relieved area and layer of heat-deflecting material provided therein being substantially centrally disposed relative to said separated area between said opposed pipe ends.

5. The coupled pipe assembly of claim 4 further comprising, said separated area of said opposed beveled ends of said pipes having a narrowed portion within which each lug is positioned and a diverging portion extending from said narrowed portion in which said weld deposit is produced.

6. The coupled pipe assembly of claim 5 further comprising, each of said retainers extending across said relieved area adjacent said outer surface of said heat-deflecting material and each said lug being centrally disposed on each said associated retainer.

* * * * *